United States Patent

Wojtkowski, Jr.

[11] Patent Number: 6,123,461
[45] Date of Patent: Sep. 26, 2000

[54] OIL FILM BEARING SLEEVE AND KEYING ARRANGEMENT

[75] Inventor: Thomas C. Wojtkowski, Jr., Marlboro, Mass.

[73] Assignee: Morgan Construction Company, Worcester, Mass.

[21] Appl. No.: 09/139,153

[22] Filed: Aug. 24, 1998

[51] Int. Cl.[7] .................................................. F16C 17/02
[52] U.S. Cl. ............................................................. 384/441
[58] Field of Search ...................................... 384/428, 441, 384/126, 99, 114

[56] References Cited

U.S. PATENT DOCUMENTS

| | | |
|---|---|---|
| 4,093,321 | 6/1978 | Ikariishi et al. .................. 384/447 |
| 4,790,673 | 12/1988 | Simmons . |
| 4,898,479 | 2/1990 | Simmons . |
| 5,000,584 | 3/1991 | Simmons . |

*Primary Examiner*—Lenard A. Footland
*Attorney, Agent, or Firm*—Samuels, Gauthier & Stevens

[57] ABSTRACT

A rolling mill oil film bearing has a sleeve with a tapered interior surface axially received on and rotatably fixed with respect to a tapered section of a roll neck. The sleeve has a cylindrical outer surface journalled for rotation within a bushing contained in a chock, with the chock, bushing and sleeve being axially removable as a unit from the roll neck. The sleeve is machined from a cylindrical forged blank which has a maximum outer diameter equal to the diameter of the sleeve's cylindrical outer surface. At least one element separate from the forged blank is secured to the sleeve. The element has a radially protruding outer portion engageable by the bushing during axial removal of the bearing unit from the roll neck.

8 Claims, 4 Drawing Sheets

6,123,461

OIL FILM BEARING SLEEVE AND KEYING ARRANGEMENT

BACKGROUND OF THE INVENTION

1. Field of the Invention

This invention relates generally to oil film bearings of the type employed to rotatably support the tapered necks of rolls in a rolling mill, and is concerned in particular with an improvement in the sleeves employed in such bearings, as well as in the manner of rotatably fixing such sleeves on and axially removing such sleeves from the roll necks.

2. Description of the Prior Art

In a conventional oil film bearing of the type shown in FIG. 7, a sleeve 10 is axially received on the tapered section 12 of a roll neck protruding axially from the roll body 16. The sleeve has a tapered interior surface 18 axially received on the tapered roll neck section 12, and a cylindrical outer surface 20 journalled for rotation in a bushing 22 contained in and fixed relative to a chock 24. One end of the sleeve is provided with a radially outwardly protruding circular flange 26, as well as with a radially inwardly protruding circular collar 28. Keyways 30 are machined into the collar 28. Keys 32 are received in notches 34 in a reduced diameter cylindrical extension 36 of the roll neck. The keys 32 protrude into the keyways 30 in the inner sleeve collar 28 to fix the sleeve 10 against rotation relative to the tapered roll neck section 12.

Other conventional bearing components include an inboard seal assembly 38, sleeve retaining ring 40, roller thrust bearing 42 and associated retaining and outboard sealing elements generally depicted at 44.

The chock 24, bushing 22, sleeve 10 and the other above described conventional components are axially receivable on and removable from the roll neck as a single unit or assembly. During axial removal, the chock 24 is pulled in the direction of arrow 46. The bushing 22 follows the chock, and by virtue of the interengagement of the outboard end of the bushing with the sleeve flange 26, the sleeve is axially dislodged and removed from the tapered section 12 of the roll neck.

With reference to FIG. 8, it will be understood that the sleeve 10 is machined from a cylindrical forging 48 initially produced with external and internal diameters indicated respectively at "X" and "Y". FIG. 9 shows the longitudinal sectional profile of the sleeve 10 superimposed on a broken line outline of the longitudinal sectional profile of the forging 48. It will be seen that outer diameter X of the forging is dictated by the necessity to accommodate the circular external flange 26, and that the inner diameter Y is likewise dictated by the necessity to accommodate the circular internal sleeve collar 28. During machining of the forging to produce the sleeve, metal is removed externally at "a" and "b", and internally at "c" and "d". The resulting loss of metal through machining amounts to approximately 2.6 times the weight of the finished sleeve. Thus, a 4,300 kg forging is required to produce a sleeve weighing approximately 1,635 kg, with approximately 2,665 kgs of metal being lost during the machining process. The cost of this lost metal is substantial, as is the cost of repeatedly heat treating it during forging and subsequently removing it during the machining process.

The objective of the present invention is to achieve significant reductions in these costs by reducing both the size of the forging required to produce the sleeve and the amount of metal lost during subsequent machining of the forging.

SUMMARY OF THE INVENTION

The present invention stems from the realization that significant reductions in the size of the forged blank as well as in the costs incurred in its processing and machining can be realized by eliminating the radially outwardly protruding circular flange 26 in favor of separate elements which can be secured to the sleeve after machining to thereby provide the required mechanical interengagement between the sleeve and bushing during bearing removal. Preferably, the separate elements comprise redesigned keys which engage with the roll neck and the sleeve in a manner also permitting elimination of the conventional inwardly protruding circular sleeve collar 28.

These and other objects, features and advantages of the present invention will now be described in greater detail with reference to the accompanying drawings, wherein:

DETAILED DESCRIPTION OF THE ILLUSTRATED EMBODIMENTS

Figure 1:
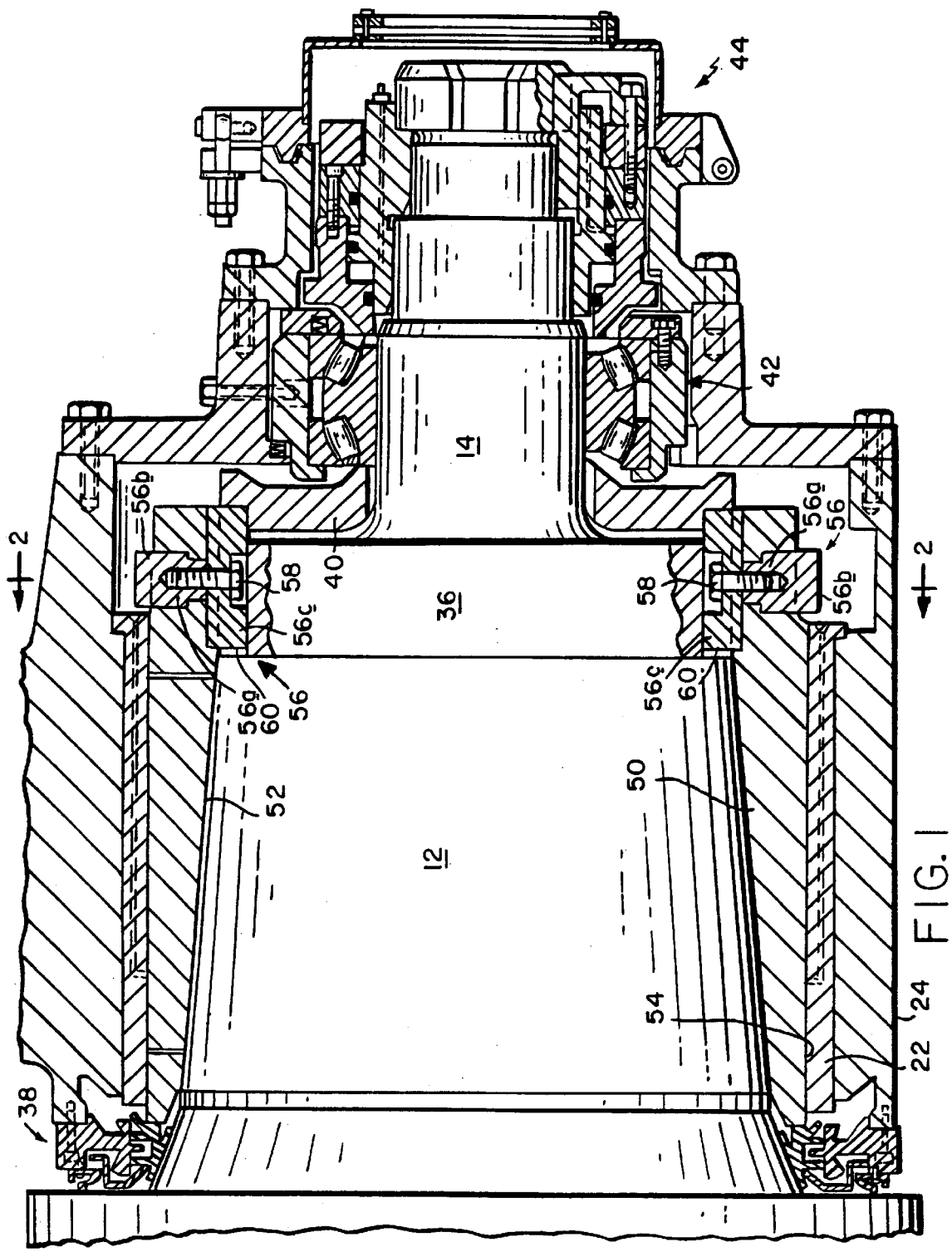
FIG. 1 is a longitudinal sectional view of a bearing assembly incorporating a preferred embodiment of a sleeve and keying arrangement in accordance with the present invention.
Figure 2:
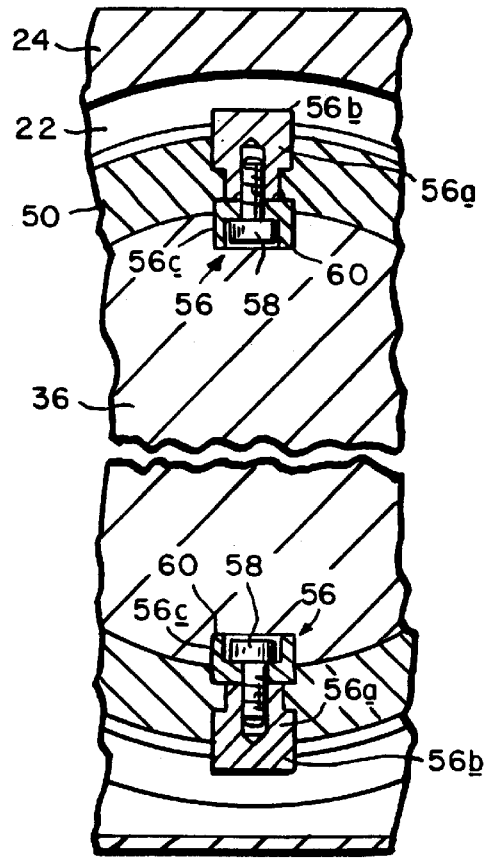
FIG. 2 is a cross-sectional view taken along line 2—2 of FIG. 1.
Figures 7, 8:
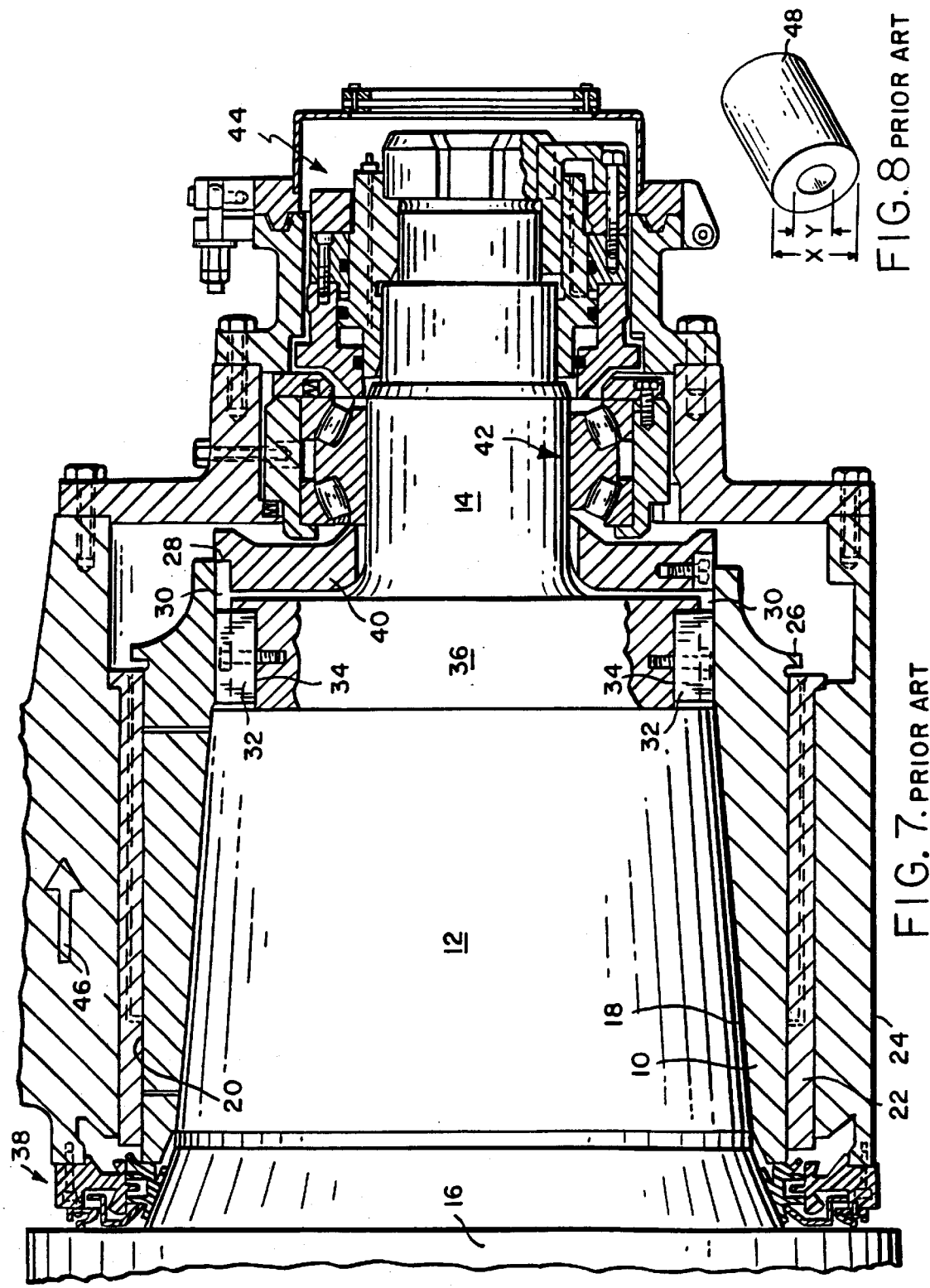
FIG. 7 is a longitudinal sectional view of a rolling mill oil firm bearing incorporating a conventional sleeve and keying arrangement.
FIG. 8 is a perspective view of a conventional cylindrical forged blank.

An oil film bearing incorporating a preferred embodiment of a redesigned sleeve and keying arrangement in accordance with the present invention is shown in FIGS. 1 and 2, where like reference numerals have been employed to identify conventional components described earlier with reference to FIG. 7. The sleeve 50 of the present invention is again provided with a tapered interior surface 52 seated on the tapered section 12 of the roll neck, and a cylindrical outer surface 54 journalled for rotation in the bushing 22 contained within the chock 24.

Figure 3:
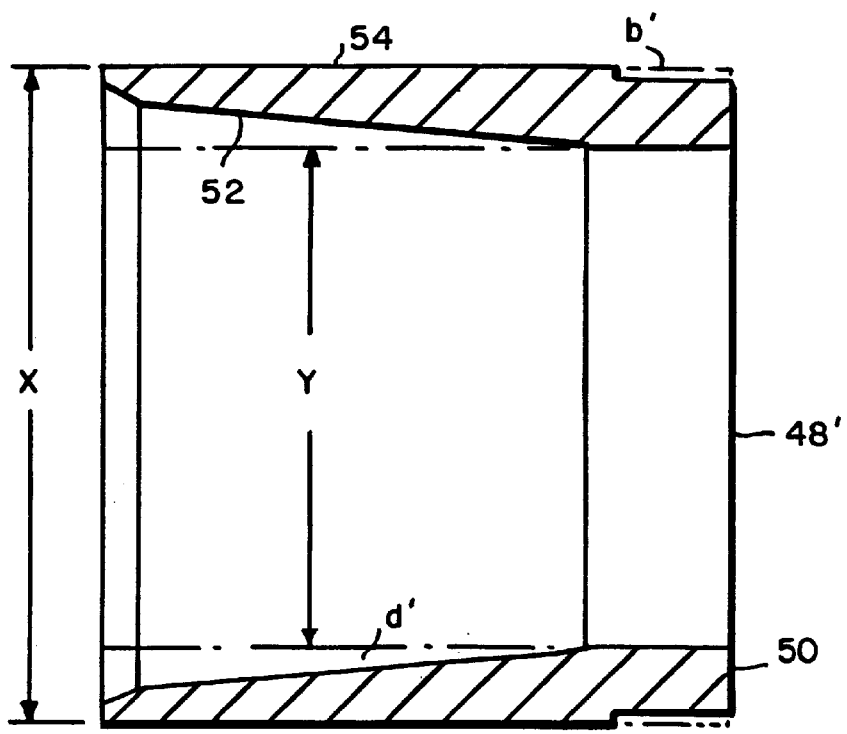
FIG. 3 is a longitudinal sectional view of the sleeve shown in FIG. 1 superimposed on the outline of a forged blank having a thinner cylindrical wall and a reduced outer diameter.

Key assemblies generally indicated at 56 are employed to rotatably fix the sleeve 50 to the roll neck. Each key has a generally T-shaped configuration, with a radial segment 56a having a protruding outer portion 56b engageable by the bushing 22 during axial removal of the bearing from the roll neck. The radial segment 56a extends through a stepped bore in the sleeve 50 and is connected to a base segment 56c by means of a bolt 58 or other like fastener. The base segment 56c is received in a groove 60 cut into the cylindrical neck section 36 adjacent to the tapered section 12 of the roll neck. The radially protruding outer portions 56b of the keys 56 take the place of the conventional circular sleeve flange 26, and the base segments 56c of the keys take the place of the conventional inwardly protruding circular collar 28. Thus, as shown in FIG. 3, the maximum outer diameter X of the forging 48' now can be reduced to the diameter of the resulting sleeve's cylindrical outer surface 54, and the minimum inner diameter Y of the forging now can be increased to the minimum inner diameter of the tapered inner surface 52. With this configuration, the cylindrical blank 48' can be forged with a thinner wall having outer and inner diameters X, Y respectively approximating the diameter of cylindrical outer surface 54 and the minimum diameter of tapered interior surface 52. Moreover, machining is only required minimally at b' as well as internally at d' to provide the requisite internal taper. By employing a smaller thinner forged blank, and reducing material lost through machining, the present invention realizes weight savings on the order of 25% as compared with the production of the conventional sleeve design depicted in FIG. 7.

Figure 4:
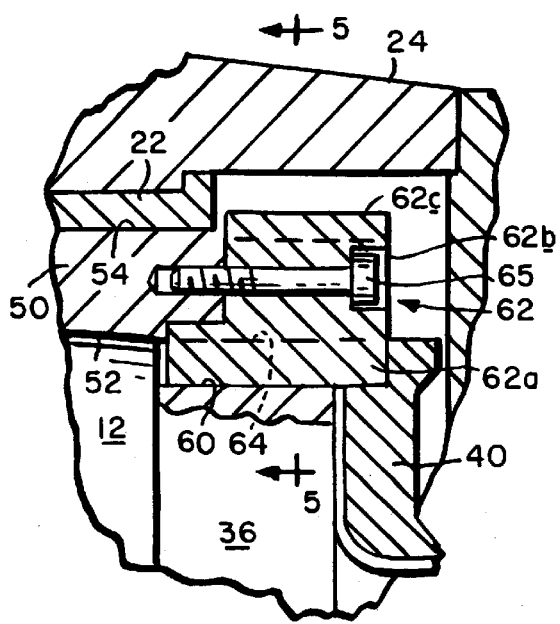
FIG. 4 is a partial sectional view showing an alternative embodiment of a keying arrangement in accordance with the present invention.
Figure 5:
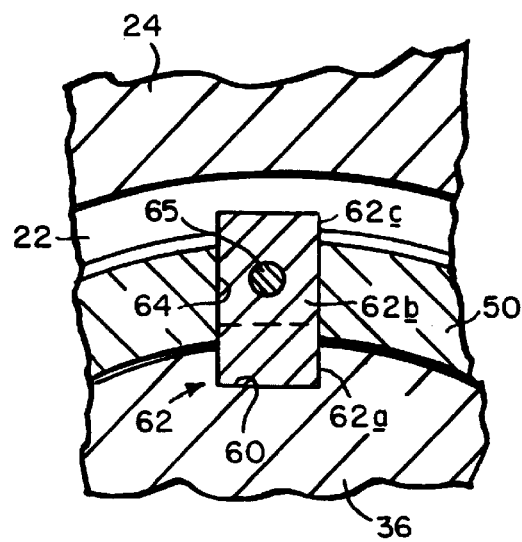
FIG. 5 is a cross-sectional view taken along line 5—5 of FIG. 4.
Figure 9:
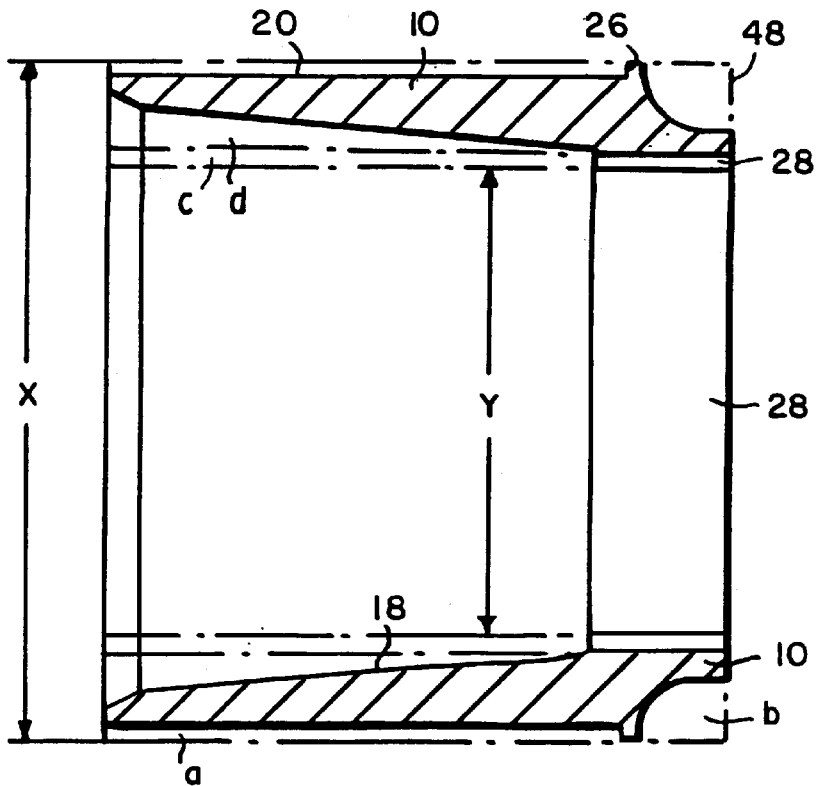
FIG. 9 is a longitudinal sectional view of a conventional sleeve superimposed on the longitudinal sectional outline of a cylindrical forged blank from which the sleeve is machined.

An alternative embodiment of the invention is depicted in FIGS. 4 and 5. Here, each key 62 is unitary and generally L-shaped, with a base portion 62a again received in a groove 60 in the reduced diameter cylindrical roll neck section 36. An intermediate key portion 62b is received in a slot 64 in the end of the sleeve 50, and a radially outwardly protruding end portion 62c is positioned for interengagement with the bushing 22 during removal of the bearing from the roll neck. The key 62 is held in place in slot 64 by a conventional threaded fastener 65. Here again, the sleeve 50 has a maximum outer diameter equal to the diameter of its outer cylindrical surface 54, and a minimum inner diameter equal to the minimum diameter of its tapered inner surface 52.

Figure 6:
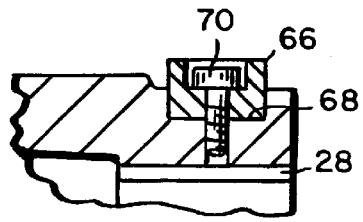
FIG. 6 is a partial cross-sectional view through another alternative embodiment of a sleeve in accordance with the present invention.

Still another although far less preferred embodiment is illustrated in FIG. 6. Here, the conventional circular inner collar 28 has been retained in order to accommodate retrofitting to conventional rolls. However, the outer sleeve flange has again been replaced by one or more radially protruding elements 66 received in pockets 68 and secured in place by fasteners 70. Although this arrangement offers less savings in lost metal and machining costs, it can still account for a decrease in lost metal on the order of 10% as compared to what is experienced when producing the conventional sleeve depicted in FIG. 7.

In light of the foregoing, it will now be appreciated by those skilled in the art that numerous modifications to the disclosed embodiments are possible. For example, the shape of the keys can be varied with the only limitation being achievement of anti-rotation interengagement between the sleeve and roll neck and axial interengagement between the sleeve and outboard bushing end. The number of keys can be varied, as can the manner in which they are removably secured in the bearing assembly.

It is my intention to cover these and any other changes or modifications encompassed within the scope of the appended claims.

I claim:

1. In a rolling mill oil film bearing of the type having a sleeve with a tapered interior surface axially received on and rotatably fixed with respect to a tapered section of a roll neck, the sleeve having a cylindrical outer surface journalled for rotation within a bushing contained in a chock, with the chock, bushing and sleeve being axially removable as a unit from the roll neck, the improvement comprising:

said sleeve having a maximum outer diameter equal to the diameter of said cylindrical outer surface; and at least one key secured to said sleeve, said key having a base portion joined to an outer portion by an intermediate portion, said base portion protruding radially inwardly from the interior of said sleeve and being seated in a groove in said roll neck, said intermediate portion extending radially through said sleeve, and said outer portion protruding radially outwardly from the exterior of said sleeve and being engageable by said bushing during axial removal of said unit from said roll neck.

2. The improvement as claimed in claim 1 wherein said sleeve has a minimum inner diameter equal to the minimum diameter of said tapered inner surface.

3. The improvement as claimed in claim 1 wherein said base portion is separably attached to said intermediate portion.

4. The improvement as claimed in claim 1 wherein said roll neck is provided with a cylindrical section adjacent to said tapered section, and wherein the base portion of said key is seated in a groove in said cylindrical section.

5. The improvement as claimed in claim 1 wherein the intermediate portion of said key is received in a slot in an end of said sleeve.

6. The improvement as claimed in claim 1 wherein the intermediate portion of said key protrudes through an aperture in said sleeve.

7. In a rolling mill oil film bearing of the type having a sleeve with a tapered interior surface axially received on and rotatably fixed with respect to a tapered section of a roll neck, the sleeve having a cylindrical outer surface journalled for rotation within a bushing contained in a chock, with the chock, bushing and sleeve being axially removable as a unit from the roll neck, the improvement comprising:

said sleeve being machined from a cylindrical forged blank and having a maximum outer diameter equal to the diameter of said cylindrical outer surface and a minimum inner diameter equal to the minimum diameter of said tapered inner surface; and at least one key separate from said forged blank and secured to said sleeve, said key having a base portion joined to an outer portion by an intermediate portion, said base portion being seated in a groove in said roll neck, said intermediate portion protruding through an aperture in and being in mechanical interengagement with said sleeve, and said outer portion protruding radially outwardly from said sleeve and being engageable by said bushing during axial removal of said unit from said roll neck.

8. In a rolling mill oil film bearing of the type having a sleeve with a tapered interior surface axially received on and rotatably fixed with respect to a tapered section of a roll neck, the sleeve having a cylindrical outer surface journalled for rotation within a bushing contained in a chock, with the chock, bushing and sleeve being axially removable as a unit from the roll neck, the improvement comprising:

said sleeve being machined from a cylindrical forged blank and having a maximum outer diameter equal to the diameter of said cylindrical outer surface and a minimum inner diameter equal to the minimum diameter of said tapered inner surface; and at least one key separate from said forged blank and secured to said sleeve, said key having a base portion joined to an outer portion by an intermediate portion, said base portion being seated in a groove in said roll neck and being separably attached to said intermediate portion, said intermediate portion being in mechanical interengagement with said sleeve, and said outer portion protruding radially outwardly from said sleeve and being engageable by said bushing during axial removal of said unit from said roll neck.

* * * * *